United States Patent
Tam et al.

(10) Patent No.: US 6,912,788 B2
(45) Date of Patent: Jul. 5, 2005

(54) BLADE STORAGE COMPARTMENT FOR POWER TOOL VACUUM PORT

(75) Inventors: Ramon Tam, Chicago, IL (US); Jaime Moreno, Wheeling, IL (US); Lou Vassos, Chicago, IL (US); Christopher Weiland, Glenview, IL (US); Richard Monteverde, Chicago, IL (US); Marcus Burzynski, Glendale Ht., IL (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 10/378,284

(22) Filed: Mar. 3, 2003

(65) Prior Publication Data

US 2004/0172833 A1 Sep. 9, 2004

(51) Int. Cl.[7] ............... B25F 3/00; A47L 7/00
(52) U.S. Cl. ............... 30/124; 30/133; 7/158; 15/339
(58) Field of Search ............... 30/124, 392–394, 30/133; 15/339; 7/158; 451/456; 83/100; D8/64

(56) References Cited

U.S. PATENT DOCUMENTS

| | | | | |
|---|---|---|---|---|
| 3,353,573 A | | 11/1967 | Hitzeroth | |
| 4,090,297 A | * | 5/1978 | Wanner et al. | 30/124 |
| 4,195,403 A | * | 4/1980 | Gruber | 30/392 |
| 4,240,771 A | * | 12/1980 | Derbyshire | 408/124 |
| 4,614,037 A | | 9/1986 | Somers | |
| 4,868,984 A | * | 9/1989 | Elsherbini | 30/133 |
| 4,870,755 A | * | 10/1989 | Schnizler | 30/123.3 |
| 5,012,583 A | * | 5/1991 | Blöchle et al. | 30/124 |
| 5,199,174 A | * | 4/1993 | Wild | 30/392 |
| 5,205,043 A | * | 4/1993 | Batt et al. | 30/393 |
| 5,398,414 A | * | 3/1995 | Neubert et al. | 30/124 |
| 5,539,985 A | * | 7/1996 | Wershe | 30/390 |
| 5,680,704 A | * | 10/1997 | Okubo et al. | 30/124 |
| D414,094 S | * | 9/1999 | Heun | D8/64 |
| 6,189,217 B1 | | 2/2001 | Melvin et al. | |
| D440,474 S | * | 4/2001 | Heun | D8/64 |
| D451,356 S | * | 12/2001 | Pretzell | D8/64 |
| D474,384 S | * | 5/2003 | Andriolo | D8/64 |
| D483,637 S | * | 12/2003 | Tam et al. | D8/64 |
| D486,711 S | * | 2/2004 | Tam et al. | D8/64 |
| 2004/0112191 A1 | * | 6/2004 | Whiffen | 83/24 |

* cited by examiner

Primary Examiner—Allan N. Shoap
Assistant Examiner—Jason Prone
(74) Attorney, Agent, or Firm—Greer, Burns & Crain, Ltd.

(57) ABSTRACT

A power hand tool of the type adapted to operate with one of a variety of elongated blades and being configured for vacuuming debris from an area near the blade during operation of the tool, wherein the tool includes a housing, a motor located within the housing, a port within said housing configured to receive a vacuum attachment, and a storage receptacle configured to carry at least one elongated blade and to matingly engage the port.

13 Claims, 4 Drawing Sheets

BLADE STORAGE COMPARTMENT FOR POWER TOOL VACUUM PORT

BACKGROUND OF THE INVENTION

The present invention generally relates to power hand tools and more particularly to a storage compartment of the type used with power hand tools for storing tool attachments.

There has been continued innovation and improvement in the design of power hand tools such as portable electric jigsaws. Examples of such products are those sold under the Bosch brand produced by the Robert Bosch Power Tool Corporation. These portable electric jigsaws include a housing to which a handle is attached, with the housing containing a drive motor having an output shaft to which a cutting blade can be attached. During sawing operation, jigsaws may generate significant debris, which is vacuumed away from the work surface with a vacuum port within the jigsaw housing. Similarly, many jigsaws also include a dust blower function, wherein dust is blown away from the work surface. Additionally, the portable electric jigsaws typically include a foot for guiding the jigsaw along a surface.

Because a portable electric jigsaw may be used with a variety of blade types and sizes, failure to properly store auxiliary blades may result in lost or damaged blades. Storing the blades in a location remote from the jigsaw itself creates an additional inconvenience, and also increases the possibility of misplacing the blades. Moreover, there is an increased demand for manufacturers to reduce the overall size of jigsaws. Consequently, adding an additional compartment specifically to accommodate storage of the blades is not ideal.

SUMMARY OF THE INVENTION

The present invention is related to a power hand tool having a vacuum port within the housing that is also configured to receive a storage receptacle. A preferred embodiment of the present invention comprises a storage receptacle that is configured to matingly engage a vacuum port within a portable electric jigsaw when the vacuum function is not in use.

DETAILED DESCRIPTION OF THE INVENTION

Many power hand tools, such as those adapted for use with one of a number of elongated blades, generate dust and other particulate debris during operation. To compensate, many of these power hand tools are configured to include a vacuum port so that when a vacuum attachment is affixed thereto, debris can be vacuumed away from the work surface during operation of the tool. However, unless a vacuum attachment is affixed to the vacuum port, the vacuum port is an empty compartment that is unused during ordinary operation of the tool without the vacuum attachment or when the tool is idle.

Moreover, since different tool applications will require different elongated blades, a user may acquire multiple elongated blades for the same tool. Because only one elongated blade is used during a single operation of the tool, the additional blades need to be stored to prevent misplacement and possible damage. Therefore, previous efforts have been directed at either housing these blades externally to the tool or internally within an enclosure designed only to hold the additional elongated blades. While this may have provided storage space for the additional elongated blades, configuring the tool to have a specific accommodation for the elongated blades where none would otherwise exist is costly in terms of overall tool size. Additionally, when stored within the tool itself, the blade storage enclosure occupies space that could be designed to have an operational utility.

Therefore, the preferred embodiment of the present invention provides for a power hand tool of the type having a vacuum port and adapted for use with elongated blades, wherein a storage receptacle, which stores additional elongated blades, is configured to be housed within the vacuum port while a vacuum attachment is not affixed thereto. Thus, the storage receptacle is configured to be stored within an existing cavity of the tool, which, in the absence of the storage receptacle, has independent utility to the tool design.

Figure 1:
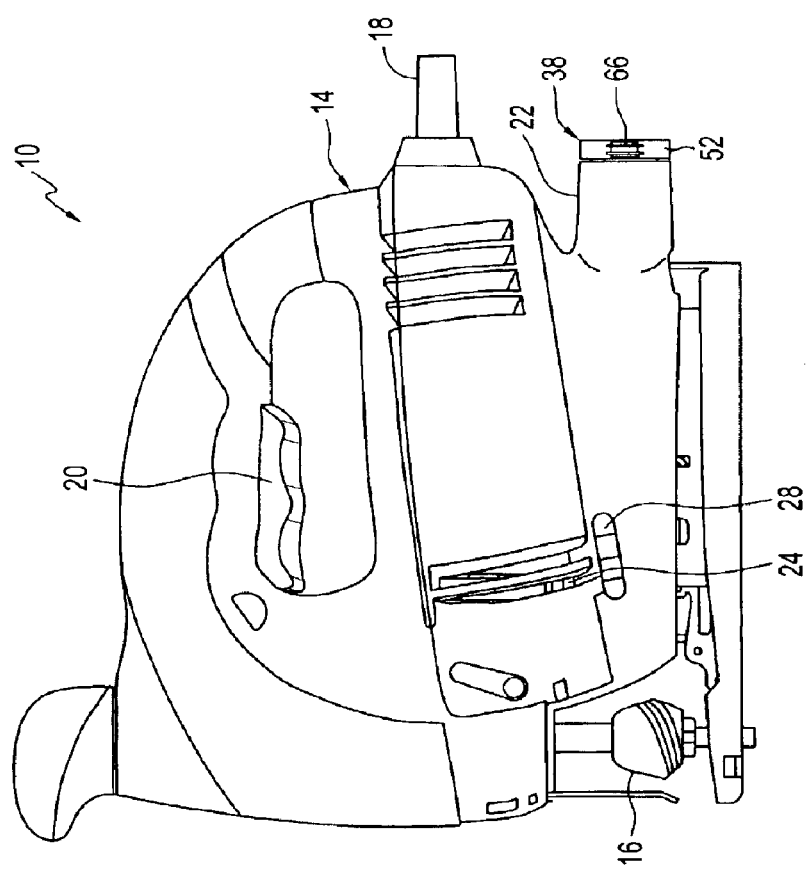
FIG. 1 is an elevational view of the jigsaw having a blade storage compartment for a power tool vacuum port.
Figure 2:
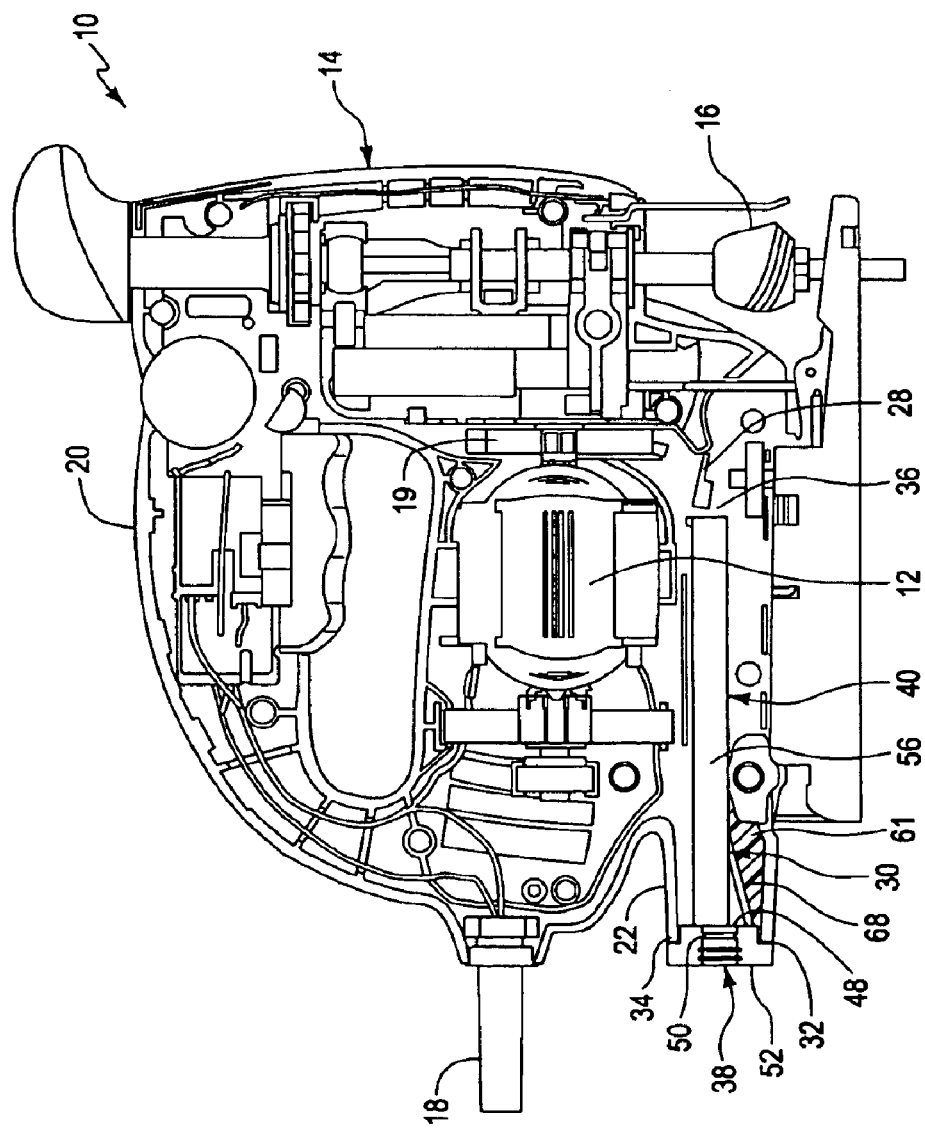
FIG. 2 is a sectional view of the jigsaw of the embodiment shown in FIG. 1.

While the present invention contemplates use with a variety of power hand tools, the preferred embodiment will be shown in connection with a portable electric jigsaw for purposes of illustration only. Turning now to FIGS. 1 and 2, the jigsaw, designated generally at 10, includes a motor 12 contained in a housing 14 and linked to a reciprocating blade retaining member 16. The motor 12 may be an AC motor with power supplied through a cord 18, or may be a DC motor with power supplied by a source such as a battery (not shown). Additionally, the motor 12 is typically supplied with a fan 19 for cooling the motor while it is in operation. Control circuitry including an on/off trigger 20 may be provided for controlling the motor 12. Those knowledgeable in the art will appreciate that these components of jigsaws are generally known, and accordingly need not be discussed in detail herein.

The preferred jigsaw 10 also includes the capability of performing a vacuum function when a vacuum attachment (not shown) is affixed thereto and a dust blower function. To enable the jigsaw 10 to perform the vacuum function, the jigsaw includes a vacuum port 22 to which a vacuum attachment may be attached and subsequently used to suck debris from the work surface and into the vacuum attachment. By harnessing air flow generated by the fan 19 cooling the motor 12, the dust blower functions by selectively opening or closing a channel (not shown) extending from between cooling vents 24 and front vents (not shown) disposed in close proximity to the blade retaining member 16. A two-way switch 28 having an open position and a closed position controls whether or not the channel is open, allowing the blowing function to commence, or closed, allowing the vacuum attachment to operate if it is attached to the jigsaw 10. Thus, the dust blower function operates only when the two-way switch 28 is in the open position, and the vacuum function operates only when the two-way is in the closed position and a vacuum attachment is attached to the vacuum port 22.

When a vacuum attachment is not attached to the jigsaw 10, the vacuum port 22 is not used to vacuum debris. Therefore, the instant invention optimizes use of the vacuum port 22 during otherwise dormant periods by configuring the vacuum port to matingly receive a blade storage receptacle 30, which is selectively removable from the vacuum port. To that end, the vacuum port 22 and the blade storage receptacle 30 include features that promote a secure engagement of the storage receptacle within the vacuum port.

Typically, the vacuum port 22 is disposed within a bottom portion of the housing 14, generally parallel to the longitudinal axis of the jigsaw 10. As illustrated in FIG. 2, the preferred vacuum port 22 includes an elongated cavity having a generally circular opening 32 with predetermined inner and outer circumferences. The vacuum port 22 has a predetermined length that spans an external end 34 and an internal end 36, wherein the external end is defined by the generally circular opening 32 and the internal end is disposed within the housing 14 of the jigsaw 10. While the predetermined length may vary to suit individual applications, the vacuum port 22 should be configured to have a length sufficient to accommodate a length of the blade storage receptacle 30 that is capable of housing elongated blades having a predetermined length and width, for example, up to 118 mm in length and up to 14 mm in width. Additionally, the inner and outer circumferences of the vacuum port 22 should be configured to matingly receive the blade storage receptacle 30, while also having enough uninterrupted outer circumference or inner circumference at the external end 34 to accommodate the attachment on either the outer or inner circumference of one a standard vacuum hose. The inner circumference of the generally circular opening 32 defines the portion of the vacuum port 22 having the largest circumference, which gradually tapers in size from the external end 34 to the internal end 36.

Figure 3:
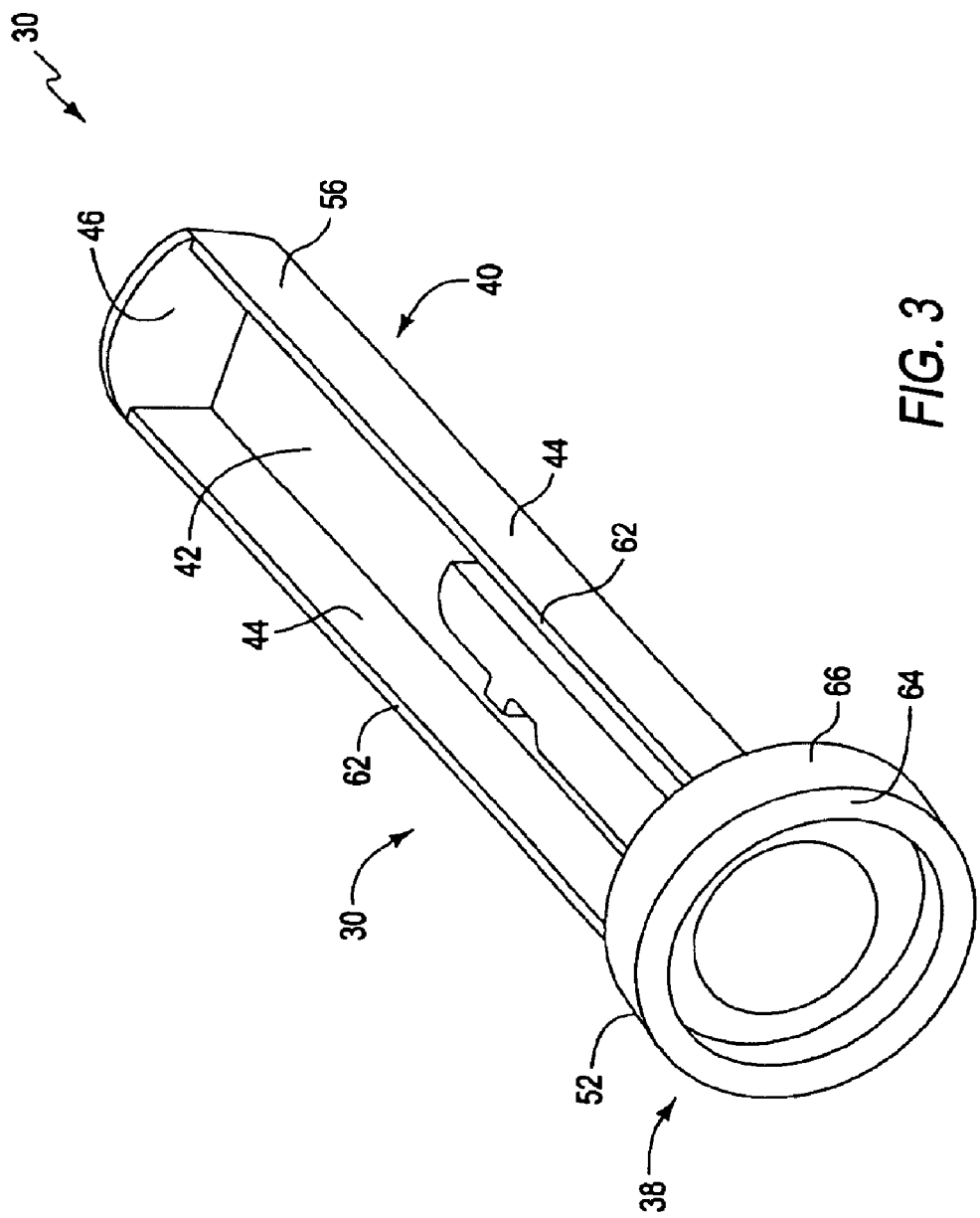
FIG. 3 is a front perspective view of the storage compartment of the embodiment shown in FIG. 1.
Figure 4:
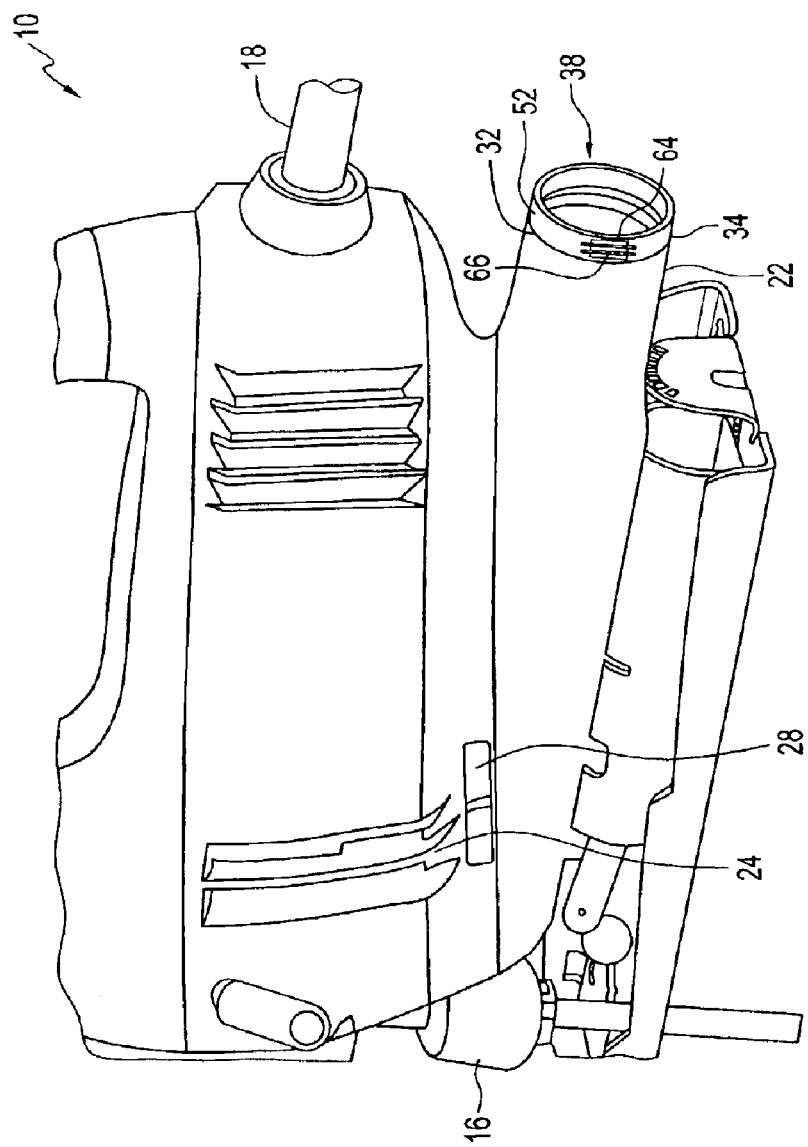
FIG. 4 is a front perspective view of the jigsaw of the embodiment shown in FIG. 1.

Turning now to FIGS. 2 and 3, the blade storage receptacle 30 includes a head portion 38 and a body portion 40, wherein the body portion is preferably a drawer-like structure having a bottom wall 42, two longitudinal side walls 44 of a predetermined height and a back wall 46 of a predetermined height. Preferably, the predetermined height of the back wall 46 is preferably slightly larger than the predetermined height of the two longitudinal side walls 44 to promote containment of the stored accessories within the blade storage receptacle 30 and to prevent the accessories from coming out of the blade storage receptacle. Optionally, containment of the accessories can also be achieved by providing a lid configured to enclose the accessories within the body portion 40, and may be affixed to the body portion via a hinged connection, a snap-fit connection, or a slide-fit connection. When the blade storage receptacle 30 is engaged with the vacuum port 22, the body portion 40 is preferably disposed entirely within the vacuum port. The head portion 38 includes an internal annular ring 48 having an annular groove 50 around a circumference thereof, and a generally circular external annular ring 52. Because the internal annular ring 48 is preferably disposed within the vacuum port 22 during engagement of the blade storage receptacle 16 with the vacuum port, and the external annular ring 52 is external to the vacuum port during engagement, the circumference of the internal annular ring is preferably smaller that than of the external annular ring.

To accommodate the blade storage receptacle 30, the vacuum port 22 preferably includes additional features for enhancing a snug, mating engagement of the blade storage receptacle, features which also prevent inadvertent rotation of the blade storage receptacle within the vacuum port. For example, a pair of radial flanges (not shown) extend along at least a portion of an internal surface of the vacuum port 22 in a longitudinal direction. Preferably, the radial flanges oppose one another on an inner diameter of the internal surface, and are separated from one another by a predetermined distance corresponding to a distance between external surfaces 56 of the longitudinal side walls 44. Because the predetermined distance between the radial flanges is preferably only slightly larger than the distance between the external surfaces 56 of the longitudinal side walls 44, the radial flanges effectively narrow the diameter of the vacuum port 22 to promote secure engagement of the blade storage receptacle 30 within the vacuum port. Additionally, because the radial flanges frictionally engage the external surfaces 56 of the longitudinal side walls 44, the blade storage receptacle is maintained in a predetermined orientation. Moreover, a proximate end of the radial flanges is tapered to ease insertion of the blade storage compartment 30 into the vacuum port 22. Distal ends preferably terminate at a predetermined distance from the internal end 36.

To provide further support for the snug engagement of the blade storage receptacle 30 within the vacuum port 22, the vacuum port also includes a raised arcuate portion 61 along a lower portion of the internal surface of the vacuum port. The raised arcuate portion 61 also promotes a smooth positioning guide during insertion of the blade storage receptacle 30 into the vacuum port 22. Like the radial flanges, the raised arcuate portion 61 effectively narrows the diameter of the vacuum port 22 to enhance a secure engagement of the blade storage receptacle 30 therein. The raised arcuate portion 61 abuts a bottom surface of the bottom wall 42, which also helps to maintain a predetermined orientation of the blade storage receptacle 30 within the vacuum port 22.

Similarly, the blade storage receptacle 30 is also configured to promote a snug mating engagement between itself and the vacuum port. For example, the distance between external surfaces 56 of the longitudinal side walls 44 is preferably configured to be slightly smaller than the distance between the radial flanges to enhance frictional engagement between the side walls and the radial flanges, thereby preventing inadvertent rotation of the blade storage receptacle 30. Additionally, because the predetermined height of the back wall 46 is preferably slightly larger than the predetermined height of the two longitudinal side walls 44, the back wall 46 may function to prevent slippage once the blade storage receptacle 30 is engaged with the vacuum port. Where the radial flanges terminate at the distal ends, a portion of the back wall 46 that is slightly higher than the longitudinal side walls 44 extends behind the distal ends to lockingly engage the distal ends.

Because the internal surface of the vacuum port 22 is generally arcuate, top surfaces 62 of the longitudinal side walls 44 are preferably rounded to promote sliding insertion of the blade storage receptacle 30 and to prevent rotation of the blade storage receptacle 30 once inserted into the vacuum port.

The head portion 38 of the blade storage receptacle 30 is also configured to enhance a snug mating engagement within the vacuum port 22. The internal annular ring 48 of the head portion 38 is configured to have a circumference that is slightly smaller than the predetermined inner circumference of the generally circular opening 32. Thus, once the blade storage receptacle 30 is inserted into the vacuum port 22, the internal annular ring 48 snugly and frictionally engages the generally circular opening 32 of the vacuum port. Optionally, the internal annular ring 48 may include the annular groove 50, which is configured to receive an O-ring (not shown) to provide a sealing engagement between the internal annular ring and the generally circular opening. Such sealing engagement both enhances the dust blower function by preventing loss of air through the generally circular opening 32, and prevents entry of debris into the vacuum port. Additionally, the sealing engagement enhances a frictional locking engagement of the blade storage receptacle 30 and the inner circumference of the vacuum port 22.

The external annular ring 52 of the blade storage receptacle 30 includes a generally circular circumference, although preferably includes slightly squared portions 64 that oppose one another on the circumference. The slightly squared portions 64 assist the user in grasping the external annular ring 52 for removing the blade storage receptacle 30 from the vacuum port 22. To that end, the slightly squared portions 64 may include scoring 66 or other surface gradations to prevent slippage of the user's fingers during removal.

The blade storage receptacle 30 may also include a plurality of engagement members 68, preferably three, along at least a portion of the bottom surface of the bottom wall 42. These engagement members 68 depend from the bottom wall 42, and abut the internal annular ring 48. At the abutment with the internal annular ring 48, the engagement members have their largest width, which gradually tapers at a predetermined distance along the longitudinal length of the bottom wall 42. Each of the engagement members 68 may have a disparate length, with the middle engagement member preferably having the longest length, while the two outer engagement members are slightly shorter. These engagement members effectively widen the diameter of the body portion 40 of the blade storage receptacle 30 to engage the raised arcuate portion 61 of the vacuum port 22 to enhance a secure engagement of the blade storage receptacle 30 therein. Thus, the engagement members 68 engage the vacuum port 22 to stabilize the orientation of the blade storage receptacle 30 and enhance engagement between the blade storage receptacle and the vacuum port 22.

While a particular embodiment of the present blade storage compartment for a power tool vacuum port has been described herein, it will be appreciated by those skilled in the art that changes and modifications may be made thereto without departing from the invention in its broader aspects and as set forth in the following claims.

What is claimed is:

1. A power hand tool of the type adapted to operate with one of a variety of elongated blades and being configured for vacuuming debris from an area near the blade during operation of said tool, said tool comprising;

a housing;

a motor located within said housing;

a port within said housing configured to receive a vacuum attachment;

a storage receptacle configured to carry at least one elongated blade and to matingly engage said port; and a switch for selectively controlling a vacuum function and a blowing function.

2. The tool of claim 1 wherein said storage receptacle is configured to house a plurality of blades.

3. The tool of the claim 1 wherein said storage receptacle is configured to be a drawer-like structure.

4. The tool of claim 1 wherein said port is configured to have a generally cylindrical shape.

5. The tool of claim 1 wherein said storage receptacle has a generally U-shaped cross-section.

6. The tool of claim 1 wherein said storage receptacle and said port are configured to maintain a predetermined orientation of said storage receptacle within said port.

7. The tool of claim 1 wherein a longitudinal axis of said port is parallel to a longitudinal axis of said tool.

8. The tool of claim 1 wherein said storage receptacle is configured to slidingly engage said port.

9. The tool of claim 1 wherein said storage receptacle has a longitudinal axis that is generally parallel to a longitudinal axis of said port.

10. The tool of claim 1 wherein said port includes an opening having a generally circular diameter.

11. The tool of claim 10 wherein said opening includes a tapered portion.

12. The tool of claim 10 wherein said storage receptacle further comprises an external end having a first and second generally circular portions, and said first generally circular portion is configured to matingly engage said opening.

13. The tool of claim 12 wherein said second generally circular portion has a circumference generally coextensive with an outer circumference of said port.

* * * * *